US012659356B2

(12) United States Patent
Gero et al.

(10) Patent No.: US 12,659,356 B2
(45) Date of Patent: Jun. 16, 2026

(54) ZERO CONFIGURATION REGISTRATION OF SERVICES IN CLOUD COMPUTE ENVIRONMENT

(71) Applicant: Akamai Technologies, Inc., Cambridge, MA (US)

(72) Inventors: Charles E. Gero, Quincy, MA (US); Rishi Dhupar, Hopkinton, MA (US); David Tang, Cambridge, MA (US); Vishal Patel, Billerica, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 18/794,055

(22) Filed: Aug. 5, 2024

(65) Prior Publication Data

US 2026/0039699 A1     Feb. 5, 2026

(51) Int. Cl.
*H04L 9/40*          (2022.01)
(52) U.S. Cl.
CPC ..................................... *H04L 63/20* (2013.01)
(58) Field of Classification Search
USPC .......................................................... 726/26
See application file for complete search history.

(56) References Cited

U.S. PATENT DOCUMENTS 8,782,122 B1    7/2014  Chang
9,198,017 B2    11/2015 Horn et al.

9,491,145 B2     11/2016  Budhani et al.
2003/0212774 A1  11/2003  Lee et al.
2011/0154373 A1* 6/2011   Kim ...................... G06F 9/5011
                                                    719/320
2014/0040443 A1   2/2014   Syu et al.
(Continued)

FOREIGN PATENT DOCUMENTS

CN          102647296 A  *  8/2012  ............. H04L 12/24

OTHER PUBLICATIONS

PCT/US2025/040460, International Search Report and Written Opinion mailed on Dec. 3, 2025, 8 pages.
(Continued)

*Primary Examiner* — Sanchit K Sarker
(74) *Attorney, Agent, or Firm* — David H. Judson

(57)          ABSTRACT

A method, apparatus and computer program product provides for zero configuration service registration in association with a network-accessible infrastructure that hosts services on behalf of an enterprise. A service is required to be registered with an authority before being online. The technique is implemented in a network-based automated bootstrap mechanism. In operation, and responsive to a determination that a new service instance is required to be brought online, a determination is made whether a peer service instance has an existing registration with the authority and is active. If so, and without requiring manual intervention, that existing registration is then leveraged on behalf of the new service instance to automatically register that instance with the authority. After automatically register the new service instance, that instance is then executed in the network-accessible infrastructure. Several automated bootstrap mechanisms are described. In one embodiment, the service instance is a connector to an enterprise application.

20 Claims, 4 Drawing Sheets

(56)                    References Cited

U.S. PATENT DOCUMENTS

| | | |
|---|---|---|
| 2016/0294842 A1* | 10/2016 | Ramalingam ........... H04L 63/08 |
| 2017/0085651 A1 | 3/2017 | Harrison et al. |
| 2018/0375731 A1 | 12/2018 | Kachalia et al. |
| 2019/0097900 A1 | 3/2019 | Rodriguez et al. |
| 2020/0195696 A1* | 6/2020 | Seed ................... H04L 65/1073 |
| 2020/0296143 A1* | 9/2020 | Mohamad Abdul ......................... H04L 65/1073 |
| 2023/0216734 A1 | 7/2023 | Kushwaha et al. |
| 2024/0129310 A1 | 4/2024 | Andrews et al. |

OTHER PUBLICATIONS

Amsüss, et al., "Constrained RESTful Environments (CoRE) Resource Directory," RFC 9176, Internet Engineering Task Force (IETF), Apr. 2022, sections 5-5.3.2.
Pritikin, et al., "Bootstrapping Remote Secure Key Infrastructure (BRSKI)," RFC 8995, Internet Engineering Task Force (IETF), May 2021, sections 1-2.4.
Richer, et al., "OAuth 2.0 Dynamic Client Registration Protocol," RFC 7591, Internet Engineering Task Force (IETF), Jul. 2015, sections 3-4.2.2.

* cited by examiner

ZERO CONFIGURATION REGISTRATION OF SERVICES IN CLOUD COMPUTE ENVIRONMENT

BACKGROUND OF THE INVENTION

This application relates generally to techniques for managing traffic on a network.

In Zero Trust Network Access (ZTNA) and Software-Defined WAN architectures, it is common to see intermediary nodes along the path between a given source and destination node. For example, a common method to protect the destination node from unwanted inbound connections is to utilize a firewall that blocks inbound traffic to the destination node located inside a private network (such as an enterprise network).

It is known in the art for such a destination node to initiate a connection outbound to the intermediary node on the public Internet, see e.g., U.S. Pat. No. 9,491,145 (Secure Application Delivery System With Dial Out and Associated Method). That connection serves as a tunnel into the private network. When a source node (e.g., an end user client) wants to connect to the destination node, it is directed to connect to the intermediary node. The intermediary node stitches that connection to the previously created outbound connection (the tunnel) from the destination node. The result is to create a facade of an end-to-end connection between the source and destination nodes. The intermediate node can then proxy the traffic between the source and destination. In this way, a remote client can gain access to a private application running on the destination node.

As mobile users and applications that they use are becoming ubiquitous, those applications that once lived in a single data center have begun to evolve. Those same applications can now be hosted by multiple servers for more CPU, more memory, more bandwidth, load-balancing, or even high-availability. The applications can even be hosted in multiple datacenters for redundancy, better geographic distribution, or even for compliance.

The challenge with applications being hosted in a multitude of locations is managing how an end-user locates the right resource and asset he or she is trying to find. To address this problem, typically an Information Technology (IT) administrator stands up these resources, and Internet Protocol (IP) addresses are then assigned to them, either dynamically or statically. An enterprise's Domain Name System (DNS) resolver is then mapped to these IP addresses. The enterprise resolver may be multi-zoned or provide for multi-views. In the case of multi-zoned DNS servers, one DNS server for a top-level domain (e.g., "example, com") typically serves as a parent. The parent server can then specify child servers for delegating subdomain requests (e.g., a request to resolve "subdomain1.example.com"). A DNS view, which is sometimes referred to as split-horizon or split-view DNS, is a configuration that allows responding to the same DNS query differently depending on the source of the query. In multi-views, the DNS server can specify what resolution to serve back based on the source IP address. For example, a multi-view configuration for a domain (e.g., test.example.com) may be configured to respond with a first IP address (e.g., 10.10.1.2) when the request's source is on the 10.10.0.0/16 CIDR (Classless Internet Domain Routing) block, and otherwise with a second (e.g., 96.10.10.20). As an alternative to the above, the IT administrator may configure a load balancer, where all the IP addresses are configured as nodes for a particular application or resource.

The above-described solutions typically rely on manual static configuration to do mapping, and thus they can be inefficient and time consuming to manage. Further, and in the case of multi-views, the solutions are inefficient when a client travels across geographies, or if some origins do not exist in a given data center. As such, intelligent mapping of a connection through a service provider's overlay network remains a challenge.

Relatedly, and with respect to scalable applications (services) hosted in the cloud, organizations are being more dynamic with compute resources and scaling services as application loads change. Typically, auto-scaling involves adjusting the number of virtual machines (VMs) that are hosting the application. While these type of solutions provide advantages, auto-scaling the underlying compute resources does not address the problem of how to manage services that need to register and associate themselves with a central authority prior to being usable. In an auto-scaling environment, typically the service images are generic, and they do not have any type of configuration (or pre-baked key) to facilitate their association or registration to the central authority, as this is not scalable from a security perspective. As a consequence, and in order to associate or register to the central authority, the auto-scaling of the underlying cloud resources itself is insufficient, as a manual operation (e.g., a human being entering a code into a portal or typing a code into the service itself) is still required to bring up the service or service instance.

It would be desirable to provide for an automated approach to obviate the manual user steps of registering with a central authority each time a new service or service instance is desired to be brought online.

SUMMARY OF THE INVENTION

A method, apparatus and computer program product provides for "zero configuration" service registration in association with a network-accessible infrastructure that hosts services on behalf of an enterprise. In this operating environment, a service is required to be registered with an authority before being online, and the authority may be a central authority that is located externally to the network-accessible infrastructure. The zero configuration registration technique is implemented in a network-based automated bootstrap mechanism. In operation, and responsive to a determination that a new service instance is required to be brought online, a determination is made whether a peer service instance has an existing registration with the authority and is active. If so, and without requiring manual intervention, that existing registration is then leveraged on behalf of the new service instance to automatically register that instance with the authority. After automatically registering the new service instance, that instance is then executed in the network-accessible infrastructure. Several automated bootstrap mechanisms are described, and each leverages the trust that the central authority has previously recognized in the peer service instance. In one example (but non-limiting) use case, the service instance is a connector to an enterprise application.

A first type of automated bootstrap mechanism is broadcast-based. In this variant, a cryptographic key associated with the existing registration is broadcast over a broadcast network domain, and the new service instance uses the cryptographic key to identify itself and automatically register with the central authority.

A second type of automated bootstrap mechanism implements a zero-configuration networking protocol (e.g., Apple® Bonjour) that provides the new service instance self-assigned link-local addressing, multicast-based name-to-address resolution, and service discovery by which the service instance automatically registers with the central authority, once again leveraging the trust that the central authority has previously recognized in the peer service instance.

A third type of automated bootstrap mechanism uses Domain Name Service (DNS), preferably one that is accessible only from inside the enterprise. In this embodiment, the DNS provides a cryptographic key that is associated with a given enterprise domain name and that was previously used by the peer service instance for registration. The new service instance uses the cryptographic key to identify itself and automatically register with the central authority.

Generalizing, the automated bootstrap mechanism facilitates a trust chain extending from the central authority through the peer service instance (as a result of the prior registration thereof) and to the new service instance.

The foregoing has outlined some of the more pertinent features of the subject disclosure. These features should be construed to be merely illustrative. Many other beneficial results can be attained by applying the disclosed subject matter in a different manner or by modifying the subject matter as will be described.

BRIEF DESCRIPTION OF DRAWINGS

For a more complete understanding of the subject matter and the advantages thereof, reference is now made to the following descriptions taken in conjunction with the accompanying drawings, in which.

DETAILED DESCRIPTION OF THE INVENTION

Figure 1:
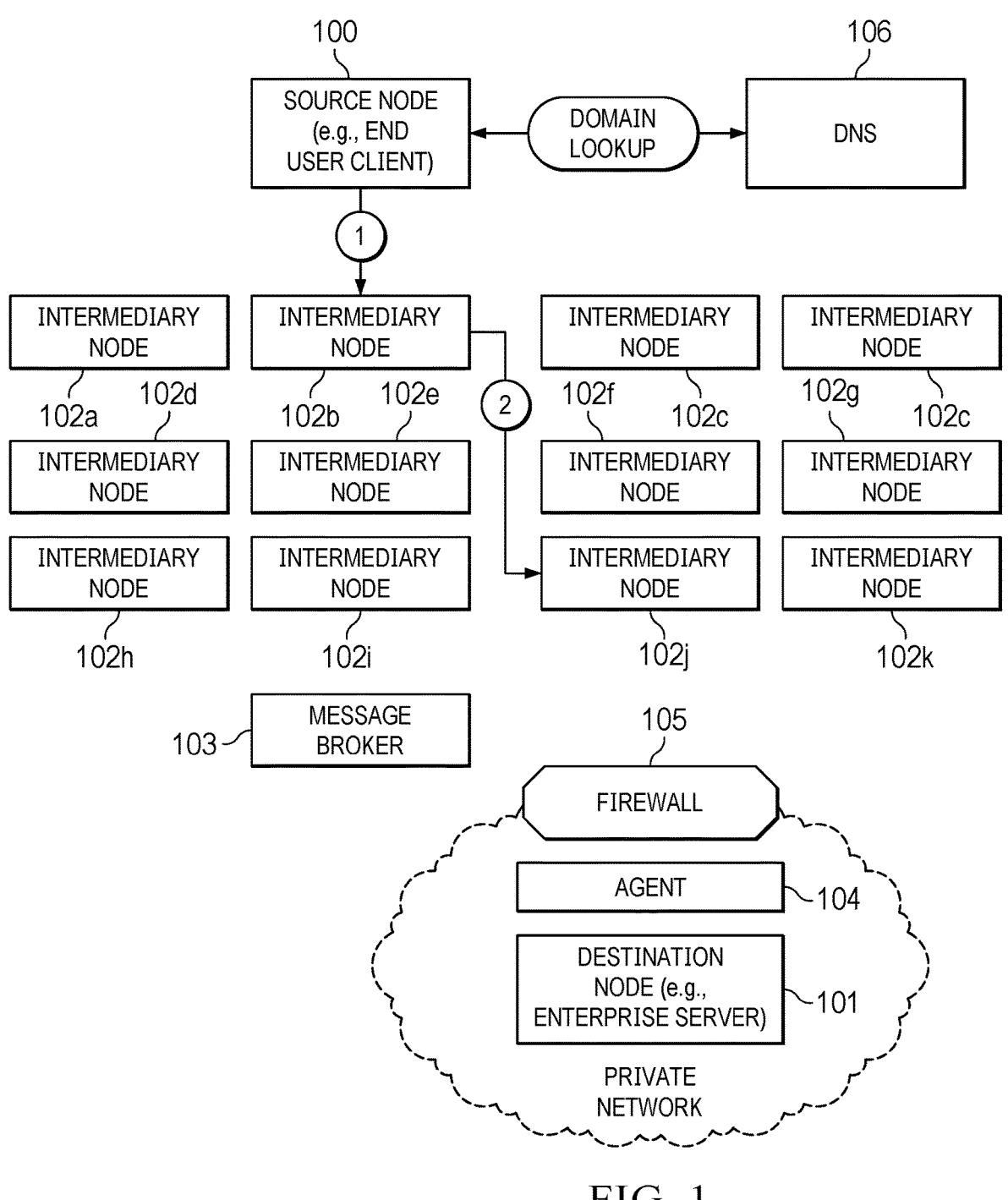
FIG. 1 is a block diagram illustrating an overlay network.

As noted above, this disclosure describes a service for automated registration of a service instance executing in network-accessible infrastructure. In one non-limiting example embodiment, the service instance is a connector or agent that is used to facilitate connections to one or more internal enterprise applications.

By way of background, in a typical operating environment of this type, an enterprise operates a distributed set of resources across a network. Some of those resources (e.g., internal enterprise applications) are hosted in network-accessible infrastructure, such as one or more datacenters of a public, private or hybrid cloud. Enterprise end users desire to access enterprise resources from the devices, such as mobile devices, laptops, and other computing devices. A location service is configured to enable discovery of locations at which instances of an application, e.g., an internal enterprise application, are located, and the location service may also be configured to facilitate routing of connection requests directed to the internal enterprise application, which typically is hosted in the one or more distinct enterprise locations that together comprise an enterprise network. The location service typically works in association with a set of connectors (or "agents"). A connector has an associated public Internet Protocol (IP) address at which it is reachable and through which a connection to an internal enterprise application instance can be proxied. Typically, however, the connector itself does not have a public IP address and thus is not reachable from a client outside of the firewall. The public IP address associated with a connector typically is the IP address of a NAT device, and that address can change at any moment. In this example embodiment, the connector associated with that public IP address is hidden from the public Internet and only accessible when it initiates active connections outbound (usually through a device such as a NAT, a firewall or other similar system fronting the connector).

Connections to the internal enterprise application are proxied or tunneled along a network path from a requesting client to a given connector through a set of intermediary nodes. Typically, the intermediary nodes are associated with an overlay network, such as a Content Delivery Network (CDN). A service provider operates the overlay network, and the overlay network comprises various systems and services (e.g., edge servers, mapping technologies, and the like) that are well-known. A commercial CDN of this type is operated by Akamai Technologies, Inc, of Cambridge, Massachusetts. Using information collected from the connectors, the service performs a series of correlations (i.e., finding matching connectors and their corresponding associated public IP addresses) to enable service provider mapping technologies to make both global and local traffic mapping decisions for these internal enterprise resources.

In a typical overlay network, the service provider deploys, provisions and operates servers as a shared infrastructure. The service provider manages the overlay network, providing a variety of infrastructure as a service (IaaS) and software as a service (Saas). Such services can include accelerating, securing, or otherwise enhancing remote client access to private network applications and servers. Typically, the service provider operates a DNS-based mapping system to direct clients to selected intermediary nodes, and to route traffic in and amongst the intermediary nodes to the destination. The DNS-based mapping system may be operated on behalf of an enterprise. Routing systems that assume intermediary nodes are able to establish forward bound connections to a destination (e.g., via BGP, OSPF, or other application layer protocols) may also be leveraged to work in an environment where a destination is actually not yet reachable on a forward-bound connection.

By way of further background of a typical operating environment of this type, FIG. 1 illustrates an example of an overlay network formed by a set of intermediary nodes 102a-k (generally "102"), which should be understood to be deployed in various locations around the Internet. In some cases, the intermediary nodes 102 may be referred to as bridging nodes or switching nodes, with no material difference in meaning.

Each intermediary node 102 may be implemented, for example, as a proxy server process executing on suitable hardware and located in a datacenter with network links to one or more network service providers. As mentioned, intermediary nodes 102 can be deployed by a service provider to provide a secure application access service for source nodes 100 (e.g., an end user client) to connect to a destination node 101 (e.g., an enterprise server) that is located in a private network (e.g., the enterprise's network). A typical example of a private network is a corporate network separated from the overlay network and indeed the public Internet by a security boundary such as a NAT and/or firewall 105, as illustrated.

Also shown in FIG. 1 is a request routing component, in this example a DNS system 106, which operates to direct given source nodes 100 to a selected intermediary node 102. The selection of intermediary nodes 102 is determined, typically, based on the relative load, health, and performance of the various intermediate nodes, and is well known in the art. Intermediary nodes 102 that are closer (in latency, or network distance, terms) to the source node 100 usually provide a better quality of service than those farther away. This information is used by the DNS 106 to return the IP address of a selected intermediary node 102, that is, in response to a domain lookup initiated by or on behalf of the source node 100. Again, such request routing technologies are well known in the art, and more details can be found for example in U.S. Pat. No. 6,108,703.

FIG. 1 also shows a message broker 103, and an agent 104. The message broker can be realized, e.g., as a publication/subscriber service such as MQTT or Apache Kafka. As such, in this example embodiment broker 103 represents a set of one or more interconnected servers providing the message broker service. The agent 104 can be an appliance or piece of software in the private network which helps facilitate on-demand connections out to the overlay network and bridge connections to the destination node. The agent 104 is also referred to herein as a "connector" application. The connector agent 104 may be combined or otherwise communicatively coupled to one or more destination nodes.

The following describes a representative operation of the above-described system. Initially, the source node 100 sends (or a recursive DNS resolver sends on its behalf) a DNS request to resolve a domain name associated with the desired service ("domain lookup"). That domain name is CNAMEd (CNAME being a DNS "Canonical Name") to another name for which the DNS 106 is authoritative (or the DNS 106 is made authoritative for the original hostname). Either way, the result of the domain lookup process is an IP address that points to a selected intermediary node, in this example 102b.

Figure 2:
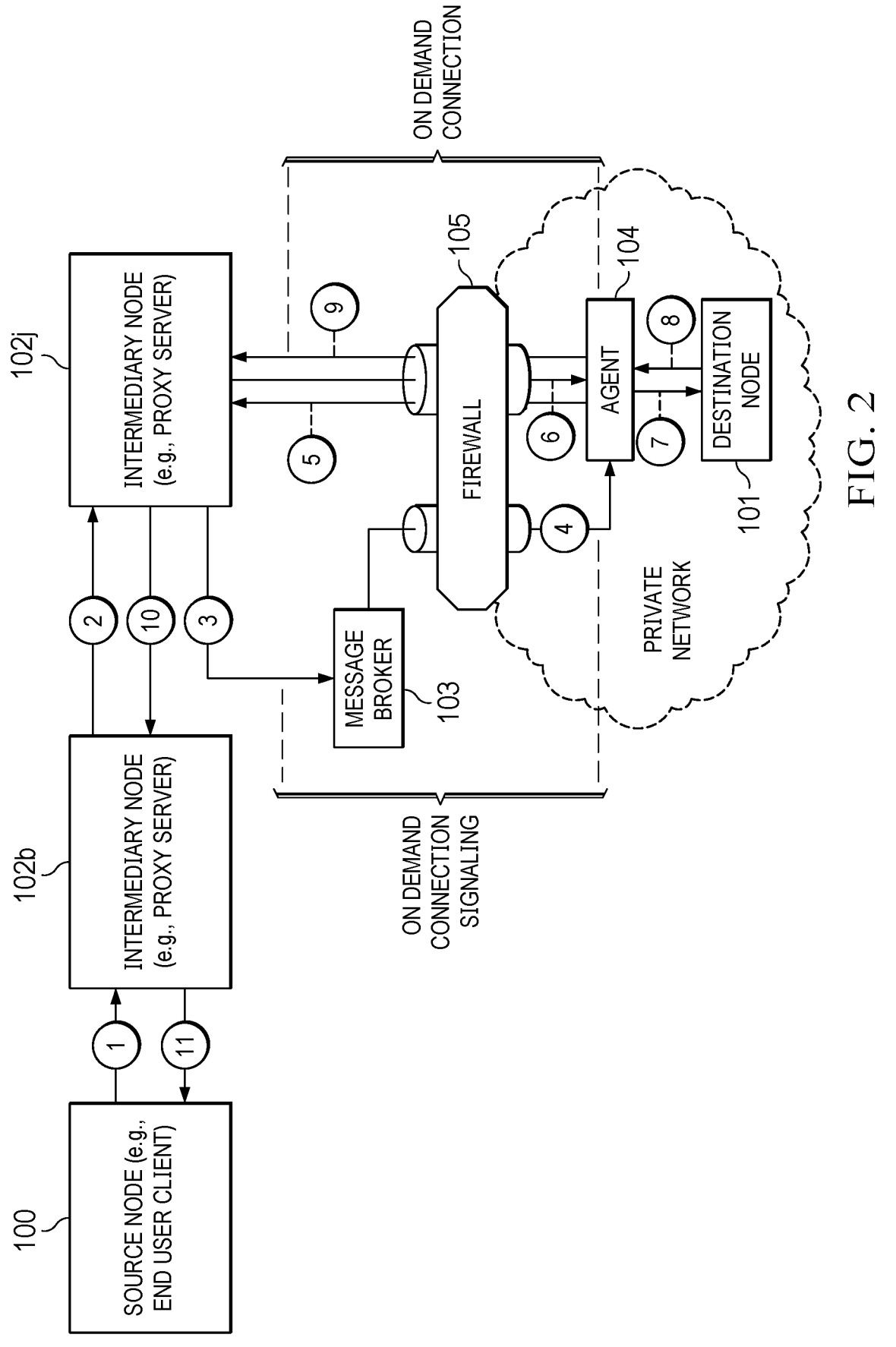
FIG. 2 is a diagram focusing on certain aspects of the system shown in FIG. 1.

The source node 100 sends a message(s) to intermediary node 102b over the Internet seeking a service from the destination node 101 (arrow 1). The job of the intermediary node 102b (and the system in general) is to tunnel the traffic from source node 100 to destination node 101. The term "tunnel" in this context is used to refer to encapsulation of data sent from the source node 100 to the destination node 101, and vice versa. It is not limited to any particular protocol. Example protocols for TCP/IP packets, or IP packets that are TCP terminated at the overlay or a connector, or for HTTP messages or message bodies include, without limitation, TCP/TLS, GRE, IPSec, HTTP2, and QUIC. As shown by arrow 2, intermediary node 102b determines to tunnel the source node's traffic to node 102j, which is another node in the overlay network. Nodes 102b and 102j may have a previously established pool of connections between them which can be reused for this purpose. (Such inter-node connections may employ enhanced communication protocols between them, e.g., as described in U.S. Pat. No. 6,820,133). The source node's traffic may be tunneled across the overlay via any one or more intermediary nodes; the example of two nodes shown in FIG. 1 is not limiting. When node 102b reaches out to 102j, node 102j is not connected to agent 104 and/or the destination node 101. To make such a connection, an on-demand connection outbound from agent 104 is initiated. FIG. 2 illustrates that process. FIG. 2 references the same system shown in FIG.

1, and arrows 1 and 2 represent the same operations already described for FIG. 1). FIG. 2, however, focuses on certain components in detail to show the process for the on-demand connection.

Starting at arrow 3 of FIG. 2, node 102j signals message broker 103 to notify agent 104 that node 102j needs an on-demand connection outbound from the agent 104/destination node 101. The message broker 103 operates a message delivery service in the manner of, e.g., a pub-sub mechanism in which agent 104 (and other agents like it deployed in other private networks) are subscribed to topics advertised by the message broker 103. An appropriate topic might be related to the private network owner or the destination node 101. Arrow 4 of FIG. 2 shows the message broker delivering the signal from the intermediary node 102j to agent 104. The signal can be delivered through a long-lived communication channel (e.g., a persistent connection) that is previously established through the firewall 105. For example, upon initialization the agent 104 may reach out to the overlay network to register and be instructed to dial out to a given IP address of the message broker 103. Preferably, the signal is a message that contains information identifying the intermediary node 102j, e.g., by IP address, and it may contain other information necessary or helpful to set up the outbound connection to the intermediary node 102j. In response to receiving the signal at arrow 4, agent 104 initiates an on-demand connection through the firewall and out to intermediary node 102j (arrow 5). At this point, node 102j can associate the tunnel from intermediary node 102b with the tunnel into private network to agent 104. Using this tunnel, intermediary nodes 102b and 102j can proxy data from the source node 100 to the agent 104 (arrows 1, 2, 6), which in turn can proxy the data to destination node 101 (arrow 7). Likewise, data from the destination node 101 can be proxied back to the source node 100 (arrows 8, 9, 10, 11). Source and destination thus can have connectivity. Broadly speaking, any data (e.g., requests and responses) sent from source node 100 to destination node 101 can be tunneled via nodes 102b, 102j, and agent 103 to the destination node, and responses from destination node 101 can likewise be tunneled back to the source node 100 so as to provide the requested private service.

The above-described operating environment is merely representative of one type of environment in which the techniques of this disclosure may be practiced. It is not intended to be limiting, however.

With the above as background, the techniques of this disclosure are now described.

Zero Configuration Registration of Service Instances

Figure 3:
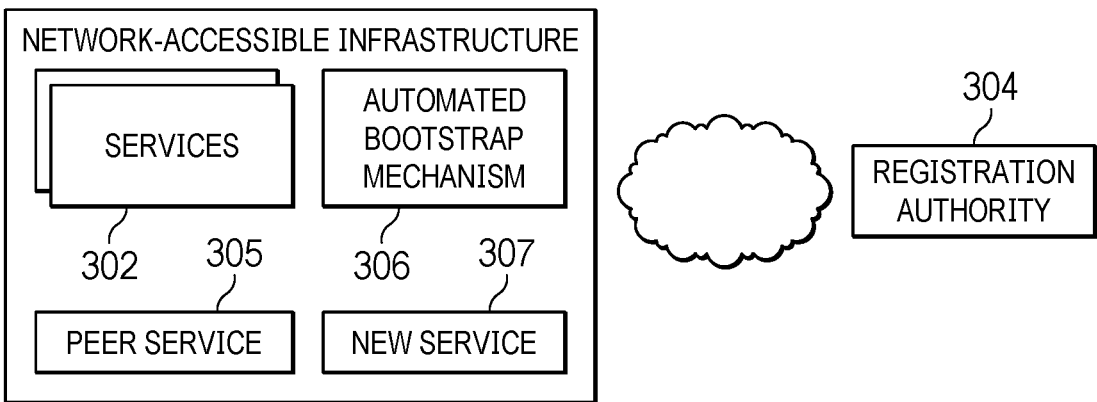
FIG. 3 depicts a high-level overview of a registration service of this disclosure.

FIG. 3 depicts a representative use case wherein a network-accessible infrastructure 300 that hosts one or more services 302 on behalf of an enterprise. A service is required to be registered with an authority 304 before it can be brought online and used by participating entities, e.g., enterprise clients. The particular nature and type of registration is not a limitation of this disclosure. In this example embodiment, it is assumed that at least one service 305 is already active (i.e., it has been previously registered with the authority 304), and that a new service or service instance 307 is now needed or desired to be brought into an active state. To facilitate that process, and according to this disclosure, a network-based automated bootstrap mechanism 306 is provided. As will be described, the automated bootstrap mechanism 306 may be of several different types, and it may leverage existing systems, sub-systems, devices and methods within the infrastructure or otherwise accessible therefrom. In operation, and upon a determination that the new service instance 307 is required to be brought up in the network-accessible infrastructure 300, the automated bootstrap mechanism 306 determines whether a peer service instance has an existing registration with the authority 304 and is active in the infrastructure. In this example, there is one such peer instance, namely, service 305, which is already registered and active. In such case, and according to this disclosure, the existing registration of service 305 is then used to facilitate the automated registration of the new service instance 307. In this way, a "zero configuration" registration is realized, as there is no requirement for system administrator or other human user to perform manual operations to facilitate bringing up the new service or service instance. In effect, the automated bootstrap mechanism 306 implements a trust chain extending from the central authority 304 through the peer service instance (as a result of the prior registration thereof) 305 and to the new service instance 307. In response to registration of the new service instance 307 in this zero configuration manner, the new service instance 307 is then executed in the network-accessible infrastructure.

Figure 4:
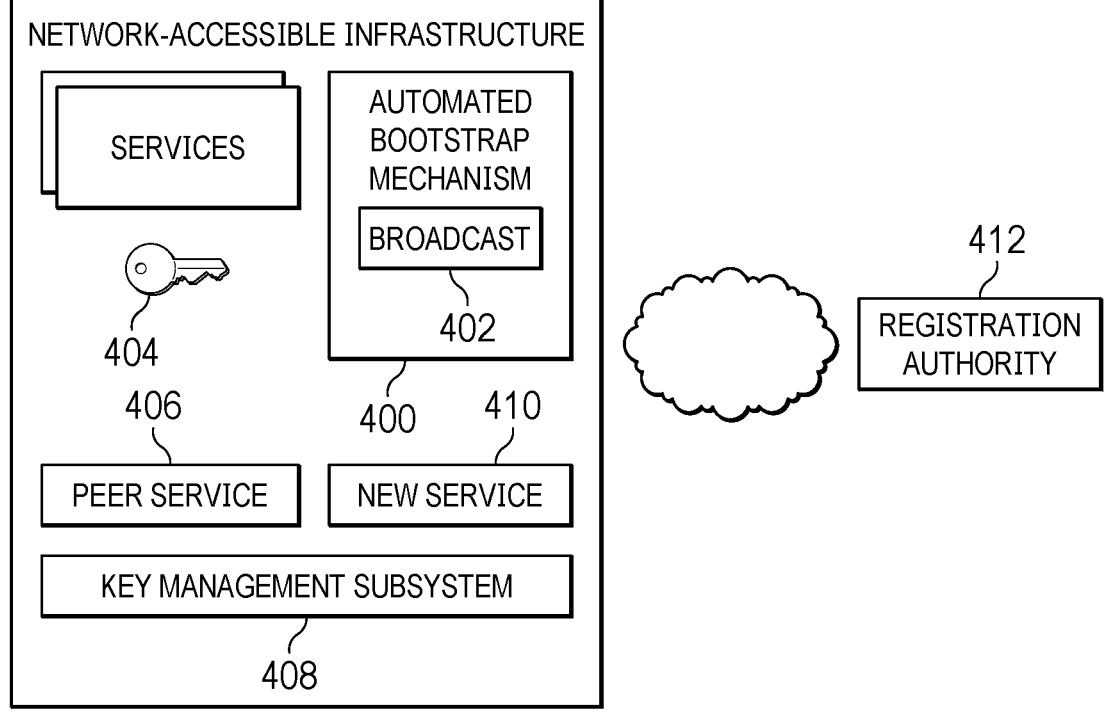
FIG. 4 depicts a first embodiment of the automated bootstrap mechanism of this disclosure.

As noted above, there may be several variants of the automated bootstrap mechanism. FIG. 4 depicts a first approach in which the bootstrap mechanism 400 leverages a broadcast protocol 402. The nature of the broadcast protocol is implementation-specific. In one example approach, a publish-subscribe (pub-sub) protocol is used for this purpose. A protocol of this type may use a message broker that receives messages and broadcasts those messages to entities that subscribe to receive them. In this example, a cryptographic key 404 is securely associated with an existing registration that has been previously established between a peer service instance 406 and a key management sub-system 408 in the enterprise. The cryptographic key 404 is broadcast over (or in association with) a broadcast network domain or hostname and thus is available for use by entities that are otherwise within a zone of trust. In this example, the new service instance 410 uses the cryptographic key 404 to identify itself and automatically register with the central authority 412 in a zero configuration manner, as previously described. These interactions are carried out securely within the enterprise network operating environment, and they may leverage other security mechanisms (authentication, authorization, key management, and the like).

Figure 5:
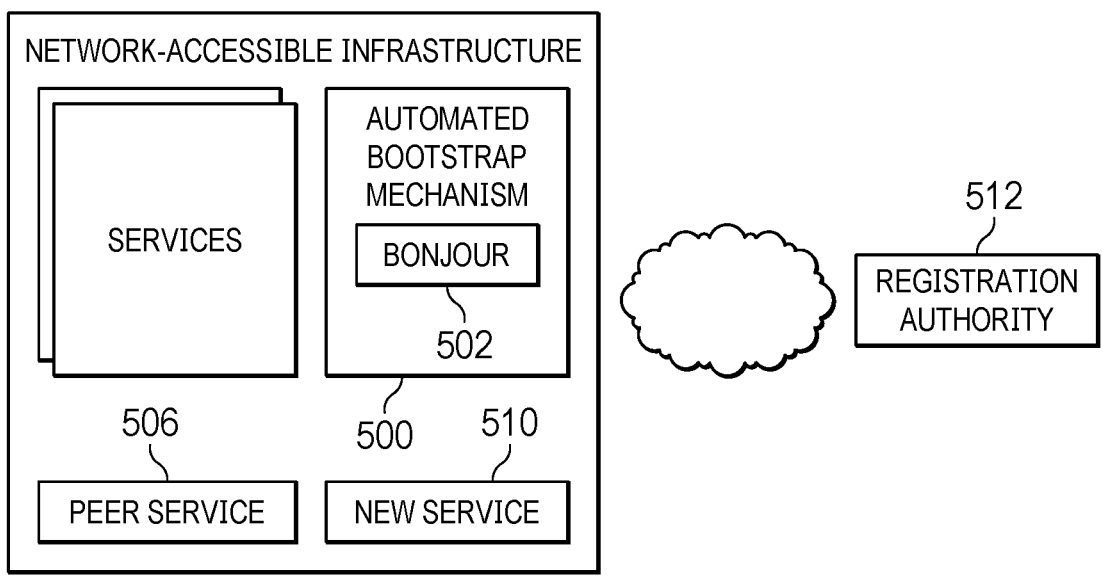
FIG. 5 depicts a second embodiment of the automated bootstrap mechanism of this disclosure.

FIG. 5 depicts a second variant of the automated bootstrap mechanism 500 that leverage an existing zero-configuration networking protocol 502, such as Bonjour. Bonjour zero-configuration networking architecture provides support for publishing and discovering TCP/IP-based services on a local area or wide area network. The Bonjour protocol supports advertising and discovering services in a manner that is efficient and robust. In this approach, Bonjour host names and service names are constructed using a specific set of rules, and the protocol uses service-specific records to advertise the existence of services. In particular, PTR records enable discovery of all services in a domain, SRV records translate a service instance name, type, and domain into a hostname and port, A and AAAA records translate a host name into an IP address, and TXT records provide additional information about a service. In this embodiment, the bootstrap mechanism leverages the ability of an application (namely, new service instance 510) that uses Bonjour to automatically detect other instances of the application (namely, the peer service 506) on the network, all without the need to manually configured IP addresses. To this end, the zero-configuration networking protocol 502 supports addressing (allocating IP addresses to hosts), naming (using names to refer to hosts instead of IP addresses), and service discovery (finding services on the network automatically). Addressing is enabled by self-assigned link-local addressing, which uses a range of addresses reserved for a local network, such as a LAN or LAN segment. Naming is enabled preferably using multicast (mDNS), wherein DNS queries are sent over the local network using IP multicast and, in particular, to a multicast address. In this example, the service itself provides its own DNS capability such that, when the service sees a query for a particular domain or hostname associated with the service, a DNS response is provided with the address. In Bonjour, an additional mDNS responder daemon automatically advertises the availability of the service. Using these resources (server-free addressing, naming, and service discovery), the new service 510 automatically registers with the central authority 512, once again leveraging the trust that the central authority has previously recognized in the peer service instance.

Figure 6:
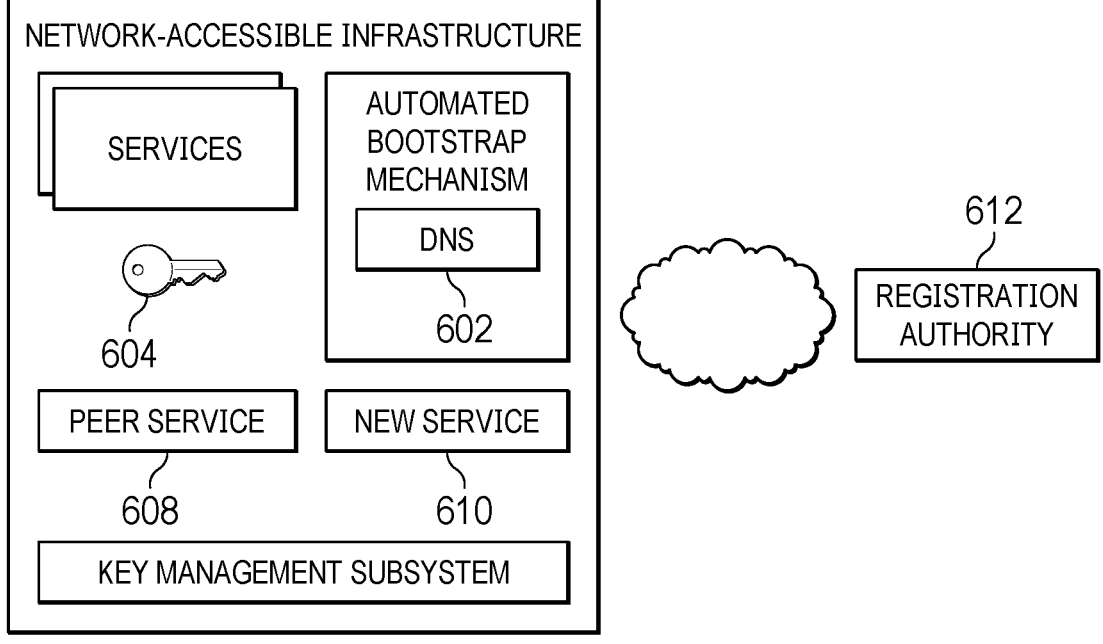
FIG. 6 depicts a first embodiment of the automated bootstrap mechanism of this disclosure.

FIG. 6 depicts a third embodiment of the automated bootstrap mechanism 600 that uses an existing enterprise Domain Name Service (DNS) 602. In this embodiment, and like the FIG. 4 embodiment, the DNS provides a cryptographic key 604 that is associated with a given enterprise domain or hostname and that was previously used by the peer service instance 606 for registration to an authority 612. Typically, this key is stored in a DNS SRV or TXT record. After retrieval, the key is used by the new service or instance to attest the enterprise's identity to the authority. In this way, the new service instance 610 uses the cryptographic key 604 to identify itself and automatically register with the authority, all without any user manual involvement or participation.

Summarizing, and when the service or service instance is brought up for the first, time, and instead of requiring a user to be involved in the registration process, the automated bootstrap mechanism uses other peer service instances on the local network to prove to the authority its registration.

The above-described techniques may interoperate with a location service, which provides the ability for enterprise resources to be discovered irrespective of what network space they may be located in. A location service of this type automatically discovers internal IP addresses of enterprise application(s) locations and thus can be used to facilitate a zero configuration registration solution that is also based on network location. In this embodiment, the location service has a first component that runs inside an enterprise network, and a second component that runs externally to the enterprise network, e.g., in a private, public or hybrid cloud, a CDN, or the like. In response to a request from the second component, the first component issues DNS requests to a specified DNS resolver inside the enterprise network, and shares the DNS response back to the second component. The second component knows what DNS resolvers exist within the enterprise network along with what first component(s) service what CIDR blocks within that network. The second component also has the capability of enforcing access permissions, and it can determine what application locations within the network provide best performance. In operation, multiple first components are triggered by the second component to perform their local DNS queries, and the responses are received and aggregated together by the second component to identify where each application instance resides, its performance and reachability.

As noted above, in one embodiment the peer service and new service (or instance) itself is a connector agent that facilitates connectivity to other internal resources associated with the enterprise. To facilitate this connectivity, a connector may have a local job running that periodically connects out to some or all service provider Points of Presence (POP). This enables the host running the connector to provide connector public IP address discovery. In particular, using this local job (e.g., a ping), the location service (the service provider) reads the source IP address of the connection and learns the public facing Network Address Translation (NAT) IP address that the connection is behind, and this public IP address is then recorded in a location service database. This discovered public NAT IP address is later used in geo-location lookups, CIDR collapsing, for latency calculations, and so forth. Each connector runs the local job and gathers the data about the public-facing IP address. The location service collects the data and stores the information, e.g., as a Connector/Public IP Address table. In addition, and once again using the local job initiated from the connector, the roundtrip time (RTT) between the connector and each POP (intermediary node) is also measured and stored in another database table. With the above discovery pre-requisites in place, a location service may then be used to map client connections to a best origin that hosts the desired enterprise resource.

A connector-based solution such as described above provides advantages. In particular, and for enterprises using a VPN or ZTNA solution, challenges to intelligently map clients to origin servers or applications arise, specifically because the origin servers are referenced by an internal IP address that is Request For Comment (RFC) 1918 compliant. In a typical service provider implementation, e.g., where an overlay network provider facilitates the VPN or ZTNA solution, these addresses overlap across tenants, bucketing by CIDR block is difficult or not possible, geo-location is not possible, and measuring RTT from service provider nodes is not possible because the origin servers are located behind firewalls. A location service/connector-based solution removes the restrictions when mapping to RFC 1918 addresses and, in particular, by performing correlation of the RFC 1918 address to reachable connectors, and then using the discovered public-facing NAT (Network Address Translation) IP addresses of the connectors to perform global mapping decisions, e.g., using existing mapping technologies available in the overlay network itself. The approach allows the system to consider all origin servers hosting an application, and to consider all service provider nodes for the intermediary paths, and without resort to static configurations on a per application or per class of client basis. By including the automated bootstrap mechanism herein, still further advantages in scale, availability and reliability of such a system are realized.

While the above bootstrap mechanism provides significant advantages in the context of the described connector-based embodiment, this is not a limitation, as the approach may be used in association with any standalone or cloud-supported enterprise-based solution wherein it is described to provide automated registration of service (application) instances, including a scenario where those applications are executing in multiple locations.

Enabling Technologies

As noted above, the techniques of this disclosure may be implemented within the context of an overlay network, such as a content delivery network (CDN), although this is not a limitation. In a known system of this type, a distributed computer system is configured as a content delivery network (CDN) and is assumed to have a set of machines distributed around the Internet. Typically, most of the machines are servers located near the edge of the Internet, i.e., at or adjacent end user access networks. A network operations command center (NOCC) manages operations of the various machines in the system. Third party sites offload delivery of content (e.g., HTML, embedded page objects, streaming media, software downloads, web applications, and the like) to the distributed computer system and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. The distributed computer system may also include other infrastructure, such as a distributed data collection system that collects usage and other data from the edge servers, aggregates that data across a region or set of regions, and passes that data to other back-end systems to facilitate monitoring, logging, alerts, billing, management and other operational and administrative functions. Distributed network agents monitor the network as well as the server loads and provide network, traffic and load data to a DNS query handling mechanism (the mapping system), which is authoritative for content domains being managed by the CDN. A distributed data transport mechanism may be used to distribute control information (e.g., metadata to manage content, to facilitate load balancing, and the like) to the edge servers.

A given machine in the CDN comprises commodity hardware running an operating system kernel (such as Linux or variant) that supports one or more applications. For example, and to facilitate content delivery services, for example, given machines typically run a set of applications, such as an HTTP proxy (sometimes referred to as a "global host" process), a name server, a local monitoring process, a distributed data collection process, and the like. Using this machine, a CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may include a storage subsystem, such as described in U.S. Pat. No. 7,472,178, the disclosure of which is incorporated herein by reference. The CDN may operate a server cache hierarchy to provide intermediate caching of customer content; one such cache hierarchy subsystem is described in U.S. Pat. No. 7,376,716, the disclosure of which is incorporated herein by reference. The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server. To enhance security, the service provider may provide additional security associated with the edge servers.

This may include operating secure edge regions comprising edge servers located in locked cages that are monitored by security cameras.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, which provide the functionality of a given system or subsystem. As described, the functionality may be implemented in a stand-alone machine, or across a distributed set of machines. The functionality may be provided as a service, e.g., as a SaaS solution.

There is no limitation on the type of machine or computing entity that may implement the end user machine and its related function herein. Any computing entity (system, machine, device, program, process, utility, or the like) may act as the client or the server. There is no limitation on the type of computing entity that may implement the function. The function may be implemented within or in association with other systems, equipment and facilities.

Typically, but without limitation, a client device is a mobile device, such as a smartphone, tablet, or wearable computing device. Such a device comprises a CPU (central processing unit), computer memory, such as RAM, and a drive. The device software includes an operating system (e.g., Google Android™, or the like), and generic support applications and utilities. The device may also include a graphics processing unit (GPU).

As noted, the location service may execute in a cloud environment. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (Saas) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

A cloud computing platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, which provide the functionality of a given system or subsystem. As described, the functionality may be implemented in a stand-alone machine, or across a distributed set of machines.

Each above-described process preferably is implemented in computer software as a set of program instructions executable in one or more processors, as a special-purpose machine.

One or more functions herein described may be carried out as a "service." The service may be carried out as an adjunct or in association with some other services, such as by a CDN, a cloud provider, or some other such service provider.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

What is claimed is as follows:

1. A method operative in association with a network-accessible infrastructure that hosts one or more services on behalf of an enterprise, wherein a service is required to be registered with an authority, comprising:

responsive to a determination that a new service instance is required to be brought up in the network-accessible infrastructure, determining whether a peer service instance has an existing registration with the authority and is active;

upon a determination that the peer service instance has an existing registration with the authority and is active, and without requiring manual intervention, leveraging the existing registration on behalf of the new service instance to automatically register the new service instance with the authority; and responsive to registration of the new service instance, executing the new service instance in the network-accessible infrastructure;

wherein the existing registration is leveraged to automatically register the new service instance with the authority via a network-based automated bootstrap mechanism, wherein the network-based automated bootstrap mechanism is one of: (i) a first mechanism configured to broadcast a cryptographic key associated with the existing registration over a broadcast network domain, wherein the new service instance uses the cryptographic key to identify itself and automatically register with the central authority; (ii) a second mechanism configured to implement a zero-configuration networking protocol that provides the new service instance self-assigned link-local addressing, multicast-based name-to-address resolution, and service discovery to automatically register with the central authority; and (iii) a Domain Name Service (DNS) that is accessible only from inside the enterprise, the DNS providing a cryptographic key associated with a given enterprise domain name, wherein the new service instance uses the cryptographic key to identify itself and automatically register with the central authority.

2. The method as described in claim 1, wherein the new service instance and the peer service instance are located in distinct locations of an enterprise network.

3. The method as described in claim 1, wherein the determination that the new service instance is required to be brought up in the network-accessible infrastructure occurs in association with an auto-scaling of compute resources in a computing system.

4. The method as described in claim 1, wherein the new service instance is a connector to an internal enterprise application within the network-accessible infrastructure.

5. The method as described in claim 1, wherein the automated bootstrap mechanism provides a trust chain extending from the authority through the peer service instance and to the new service instance.

6. The method as described in claim 1, wherein the one or more services also include a location service that provides discovery of resources of the enterprise in a network space in which the resources are located.

7. The method as described in claim 1, wherein the new service instance is an instance of an enterprise application.

8. An apparatus operating in association with a network-accessible infrastructure that hosts one or more services on behalf of an enterprise, wherein a service is required to be registered with an authority, comprising:

a processor;

computer memory storing computer program instructions configured as a network-based automated bootstrap mechanism to:

respond to a determination that a new service instance is required to be brought up in the network-accessible infrastructure, to determine whether a peer service instance has an existing registration with the authority and is active;

upon a determination that the peer service instance has an existing registration with the authority and is active, and without requiring manual intervention, leverage the existing registration on behalf of the new service instance to automatically register the new service instance with the authority; and responsive to registration of the new service instance, execute the new service instance in the network-accessible infrastructure;

wherein the network-based automated bootstrap mechanism includes one of: (i) a first mechanism configured to broadcast a cryptographic key associated with the existing registration over a broadcast network domain, wherein the new service instance uses the cryptographic key to identify itself and automatically register with the central authority; (ii) a second mechanism configured to implement a zero-configuration networking protocol that provides the new service instance self-assigned link-local addressing, multicast-based name-to-address resolution, and service discovery to automatically register with the central authority; and (iii) a Domain Name Service (DNS) that is accessible only from inside the enterprise, the DNS providing a cryptographic key associated with a given enterprise domain name, wherein the new service instance uses the cryptographic key to identify itself and automatically register with the central authority.

9. The apparatus as described in claim 8, wherein the new service instance and the peer service instance are located in distinct locations of an enterprise network.

10. The apparatus as described in claim 8, wherein the determination that the new service instance is required to be brought up in the network-accessible infrastructure occurs in association with an auto-scaling of compute resources in a computing system.

11. The apparatus as described in claim 8, wherein the new service instance is a connector to an internal enterprise application within the network-accessible infrastructure.

12. The apparatus as described in claim 8, wherein the automated bootstrap mechanism provides a trust chain extending from the authority through the peer service instance and to the new service instance.

13. The apparatus as described in claim 8, wherein the one or more services also include a location service that provides discovery of resources of the enterprise in a network space in which the resources are located.

14. The apparatus as described in claim 8, wherein the new service instance is an instance an enterprise application.

15. A computer program product in a non-transitory computer-readable medium, the computer program product comprising computer program instructions configured as program code and executable in one or more hardware processors in association with a network-accessible infrastructure that hosts one or more services on behalf of an enterprise, wherein a service is required to be registered with an authority, the program code comprising:

a network-based automated bootstrap mechanism configured to:

respond to a determination that a new service instance is required to be brought up in the network-accessible infrastructure, to determine whether a peer service instance has an existing registration with the authority and is active;

upon a determination that the peer service instance has an existing registration with the authority and is active, and without requiring manual intervention, leverage the existing registration on behalf of the new service instance to automatically register the new service instance with the authority; and responsive to registration of the new service instance, execute the new service instance in the network-accessible infrastructure;

wherein the network-based automated bootstrap mechanism includes one of: (i) a first mechanism configured to broadcast a cryptographic key associated with the existing registration over a broadcast network domain, wherein the new service instance uses the cryptographic key to identify itself and automatically register with the central authority; (ii) a second mechanism configured to implement a zero-configuration networking protocol that provides the new service instance self-assigned link-local addressing, multicast-based name-to-address resolution, and service discovery to automatically register with the central authority; and (iii) a Domain Name Service (DNS) that is accessible only from inside the enterprise, the DNS providing a cryptographic key associated with a given enterprise domain name, wherein the new service instance uses the cryptographic key to identify itself and automatically register with the central authority.

16. The computer program product as described in claim 15, wherein the determination that the new service instance is required to be brought up in the network-accessible infrastructure occurs in association with an auto-scaling of compute resources in a computing system.

17. The computer program product as described in claim 15, wherein the new service instance is a connector to an internal enterprise application within the network-accessible infrastructure.

18. The computer program product as described in claim 15, wherein the automated bootstrap mechanism provides a trust chain extending from the authority through the peer service instance and to the new service instance.

19. The computer program product as described in claim 15, wherein the one or more services also include a location service that provides discovery of resources of the enterprise in a network space in which the resources are located.

20. The computer program as described in claim 15, wherein the new service instance is an instance of an enterprise application.

\* \* \* \* \*